United States Patent [19]

Holmes

[11] 4,313,453
[45] Feb. 2, 1982

[54] THERMALLY OPERATED VALVE

[75] Inventor: Paul M. Holmes, Jackson, Mich.

[73] Assignee: Aeroquip Corporation, Jackson, Mich.

[21] Appl. No.: 89,515

[22] Filed: Oct. 30, 1979

[51] Int. Cl.³ ............................................. F16K 13/04
[52] U.S. Cl. .................... 137/74; 220/89 B; 220/201; 62/292
[58] Field of Search .................. 137/72, 74; 220/89 B, 220/201; 62/292, 298

[56] References Cited

U.S. PATENT DOCUMENTS

| | | | |
|---|---|---|---|
| 243,847 | 7/1881 | Burritt | 137/74 X |
| 1,924,869 | 8/1933 | Lovekin | 137/72 |
| 2,500,119 | 3/1950 | Cooper | 220/89 B X |
| 2,782,496 | 2/1957 | Augustauskas | 137/74 X |
| 2,828,759 | 4/1958 | Gerhart | 137/74 |

Primary Examiner—Harold W. Weakley
Attorney, Agent, or Firm—Beaman & Beaman

[57] ABSTRACT

A valve for conduit systems, such as a base valve for precharged refrigeration circuits, wherein the valve element is initially closed, and is opened by the application of heat to the valve body exterior. The valve element is maintained in a closed or sealed position by a low temperature fusible material, such as solder, and the application of exterior heat melts the fusible material to release the valve element and open the valve to unrestricted flow therethrough. The valve structure includes means for preventing restriction by the released valve element.

4 Claims, 4 Drawing Figures

THERMALLY OPERATED VALVE

BACKGROUND OF THE INVENTION

In special applications there is a need for single cycle valves which need only perform a valve function once during their use. Such apparatus is employed in the refrigeration arts wherein precharged components of a refrigeration system are pressurized with a refrigerant at the factory, shipped and assembled at the site of use. Such precharged refrigeration units may include the evaporator unit, a compressor-condenser unit, and the conduit system utilized to interconnect these units. Coupling fittings are presently used with such precharged systems which employ diaphragms severed by piercing members wherein interconnecting of the coupling halves, usually by a nut, ruptures the diaphragm and permits fluid interconnection between the coupled parts.

Rupturable diaphragm couplings, commonly called "one-shot" couplings, are expensive to manufacture, requiring several machined components, and the fracturing of the diaphragms often results in loose fragments within the conduit system. The ruptured diaphragm often produces ragged and sharp edges, and the irregular flow orifices that may result produce restriction to fluid flow, and undesirable turbulence. "One-shot" couplings of the aforementioned type are shown in U.S. Pat. No. 2,933,333 and in the assignee's U.S. Pat. No. 3,202,442.

It is an object of the invention to provide a single cycle valve which may be used with precharged refrigeration systems, and the like, which is of economical construction and positive in operation, providing unrestricted fluid flow when the valve element has been opened.

Another object of the invention is to provide a single cycle valve of economical manufacture which is thermally operated wherein the external application of heat to the valve body releases a valve element from its seated condition, and wherein the released valve element is retained at a location which does not interfere with the fluid flow through the valve body.

Yet another object of the invention is to provide a single cycle valve of a sheet metal construction wherein the external application of heat releases a seated valve element from a valve chamber inlet port, and the valve chamber includes an outlet port including a projection having an arcuate surface which prevents the accidental seating of the released valve element in the outlet port to restrict fluid flow.

In the practice of the invention a pair of sheet metal components are soldered or brazed together in fluid tight connected relationship. Each component includes an enlarged bell portion and a tubular stem portion concentric with the bell portion. The bell portions of the parts are interconnected whereby the stems are in opposed coaxial relationship with respect to a chamber defined by the bell portions.

The interconnection of the stems with the chamber defines inlet and outlet ports, and a valve element is soldered with a low temperature fusible material within the inlet port. The application of external heat to the bell portion adjacent the valve element melts the fusible material causing the valve element to fall to the lower region of the valve chamber thereby permitting unrestricted fluid flow through the valve chamber and stems.

Preferably, the chamber outlet port includes a projection extending into the chamber having an arcuate surface which prevents seating of the valve element within the outlet port, and prevents the released valve element from accidentally restricting the valve against fluid flow therethrough.

The transverse dimension of the valve chamber is considerably greater than the transverse cross sectional dimension of the stem in which the valve element is originally sealed, whereby the release of the valve element permits the same to rest offset with respect to the flow path through the valve body.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
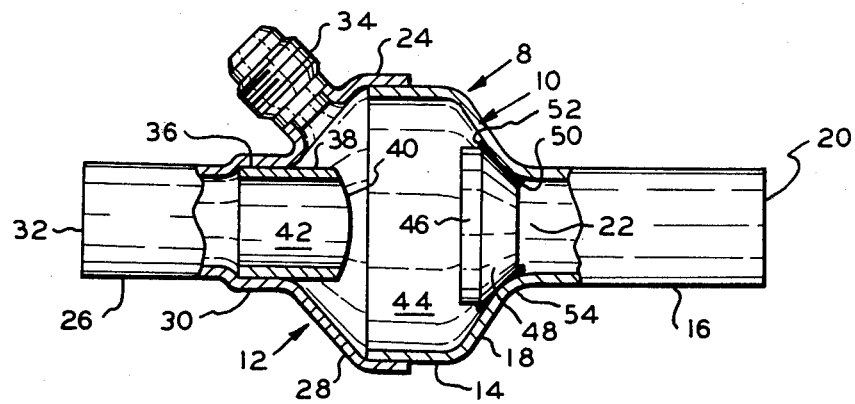
FIG. 1 is an elevational view, partially in diametrical section, illustrating a valve in accord with the invention, the valve element being sealed within the inlet port.
Figure 2:
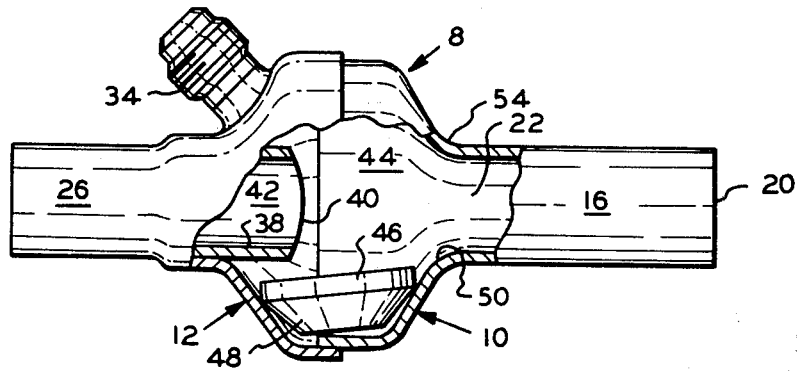
FIG. 2 is an elevational view, partially in section, illustrating the location of the valve element after being released from the inlet port.

With reference to FIGS. 1 and 2, a thermally operated single cycle valve 8 in accord with the invention utilizes a pair of sheet metal parts 10 and 12 which are interconnected in a fluid tight manner, each part including an elongated stem for association with a conduit system, not shown.

The part 10 includes an enlarged cylindrical bell 14 which merges with a cylindrical stem 16 through intermediate conical portion 18. The stem 16 includes an end 20, and the end 20 may be soldered or otherwise affixed to a conduit system, such as the compressor side of a refrigeration circuit. The passage of the stem 16 communicates with the interior of the space defined by bell 14 and portion 18 at an opening 22 hereinafter referred to as the inlet port for the valve.

The valve body part 12 also includes a cylindrical bell portion 24 and a stem 26 concentrically related thereto and associated therewith through a transitional conical portion 28 and a cylindrical portion 30. The stem includes end 32 which may be attached to the evaporator side of the conduit system by brazing, soldering, or the like. A threaded charging port 34 of conventional form may be mounted upon the portion 28 communicating with the chamber defined thereby wherein the valve may be purged of air and the system may be charged with refrigerant.

The cylindrical portion 30 defines a cylindrical recess 36 for receiving the tubular projection 38, and the projection may be press fitted, soldered, brazed, or otherwise mounted within the recess 36. The projection 38 includes an inner end having a convex surface 40 which would prevent a sealed relationship by a flat member, such as the released valve element, as will be later described, and the projection passage forms an outlet port 42.

The valve body bell portions 14 and 24 are of such dimension as to permit telescoping as shown in FIGS. 1 and 2, and the overlapped engaging surfaces of the bell portions are silver soldered to firmly mechanically interconnect the parts in a fluid tight manner defining a chamber 44 having an inlet port 22, and an outlet port 42.

One of the chamber ports, usually the inlet port 22, is initially sealed with a valve element 46. The valve element 46 comprises a plug formed of metal having a conical surface 48 which engages the inlet port radius 50 as apparent in FIG. 1. A fusible material 52, such as solder or the like, having a relatively low melting point maintains the valve element within the inlet port 22 in a sealed fluid tight manner. The initial soldering of the valve element in port 22 may take place before of after assembly of bell portions 14 and 24, and the conical surface 48 aids in positioning the valve element against radius 50.

The stem end 20 is soldered, brazed or clamped to a conduit system, not shown, which is to be precharged with refrigerant, and the presence of the valve element 46 permits the associated conduit system to be fluid tight and capable of holding a pressurized refrigerant for extended periods of time without leakage.

In use, the stem 26 will be affixed to another component of the refrigeration system by soldering, brazing, or the like, and once this fluid tight connection has been made the chamber 44 may be purged and charged through charge port 34. Charge port 34 may include a conventional valve, and is exteriorly threaded for receiving a sealing cap of conventional construction, not shown.

When it is desired to "open" the valve 8 heat is applied to the part 10 at the exterior intersection of the stem 16 with surface 18, i.e., at the location 54 opposite the solder 52. Such heat may be readily applied by means of a propane torch, and because of the low fusing temperature of the fusible material 52 little heat is required, especially in view of the thin walled construction of part 10. Upon the material 52 melting the weight and configuration of the valve element 46 is such that it will fall to the lower region of the chamber 44 as illustrated in FIG. 2, and the conical surface 48, as well as the conical configuration of surface 18, aids in the valve element in orienting itself as illustrated. As so positioned, the valve element 46 is completely removed from the flow passage between the ports 22 and 42, and the refrigerant freely flows through the valve 8 with no restriction or adverse turbulence.

Preferably, the valve 8 is installed such that the axes of the stems 16 and 26 are substantially horizontal. However, to insure that the released valve element 46 does not block or restrict the outlet port 42 the extension of the projection 38 into the chamber, and the provision of the arcuate surface 40 renders it impossible for the valve element to completely restrict the outlet port, and this configuration of the projection, in most cases, would hold the valve element 46 to one side of the projection, and outlet port, even if the axes of the stems were substantially vertical, with the stem 26 being located downwardly. Of course, the flow of the refrigerant from the inlet port 22 through the outlet port 42 precludes the accidental restriction of the inlet port by the valve element 46.

Figure 4:
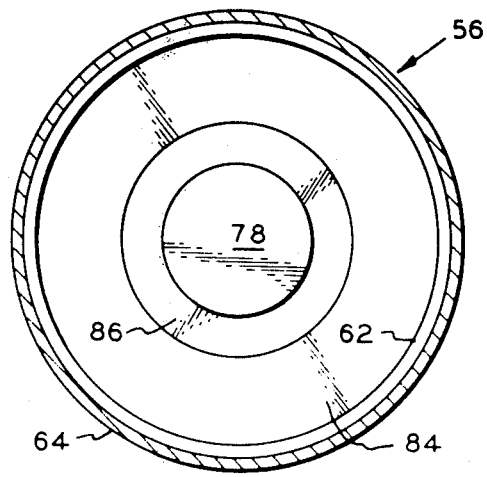
FIG. 4 is an enlarged, transverse sectional view as taken along Section IV—IV of FIG. 3.
Figure 3:
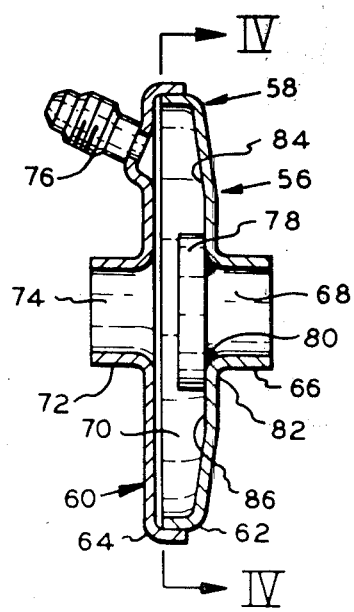
FIG. 3 is a diametrical, sectional view of another embodiment of thermally operated valve in accord with the invention, the valve element being located within the valve inlet.

The embodiment shown in FIGS. 3 and 4 operates in a manner identical to the embodiment of FIGS. 1 and 2, however, the configuration of the valve parts is different whereby a more axially concise configuration is produced. The valve 56 consists of parts 58 and 60, each including a cylindrical bell portion 62 and 64, respectively, interconnected in telescoped relationship by soldering or brazing. The inlet stem 66 defines an inlet port 68 with chamber 70, while the outlet stem 72 defines outlet port 74 in aligned relationship to the inlet port. A charging port 76 is defined in one of the parts and communicates with the chamber.

The inlet port 68 is sealed by a disc-like valve element 78 blocking the inlet port 68 and held in position by a fusible material 80 sealing the stem 66 with respect to the chamber 70.

In use, the stem 66 is connected to the precharged circuit, usually the compressor side, sealing the same. The stem 72 is connected to the condenser side, and upon purging and charging of the system through charging port 76, the valve element 78 is released from the inlet port 68 by the application of external heat at the location indicated at 82. The melting of the material 80 permits the valve element to fall to the lower region of the chamber 70, and the diameter of the chamber 70 is such as to retain the valve element clear of the flow passages through the stems 66 and 72. In this embodiment, the axes of the stems should be oriented substantially horizontal in order to assure against the released valve element accidentally restricting the outlet port.

The bell portion 62 includes conical surface 84 and concentric planar surface 86, and these surfaces permit the valve element 78 to be centered over the inlet port 68 by shaking or vibrating the assembled valve 56 with the stem 66 down. Thus, during valve manufacture, a solder flux and solder may be applied to valve element 78 through stem 66 and the valve element soldered in place by the external application of heat at 82.

The aforedescribed single cycle valves function well with precharged refrigeration circuits, and the short duration of heat to the valves to release the valve elements does not adversely affect the refrigerant. Further, the fact that the valve chamber may be purged and filled with refrigerant prior to opening of the valve element completely excludes air from the refrigeration circuit assuring efficient operation.

The sheet metal construction of the valve in accord with the invention significantly reduces the cost of manufacture of a single cycle valve as compared with prior constructions, and it is appreciated that various modifications to the inventive concepts may be apparent to those skilled in the art without departing from the spirit and scope of the invention.

I claim:
1. A thermally operated valve for closed conduit systems comprising, in combination, a hollow metal body forming a chamber having inlet and outlet ports defined therein, said body being formed of sheet metal and including two interconnected parts each having an enlarged portion and an elongated tubular stem, said enlarged portions telescoping upon each other and sealingly interconnected, the intersection of said stems with the associated enlarged portion constituting a port, a plug within said chamber extending across at least one of said ports sealing said one port, and a fusible bonding material affixing said plug to said body across said one port whereby heat externally applied to said body melts said bonding material permitting said plug to to fall within said chamber and unseal said one port.

2. In a thermally operated valve as in claim 1, a charging port defined in one of said enlarged portions.

3. In a thermally operated valve as in claim 1, said enlarged portions and stems each being of a substantially cylindrical configuration, said stems being concentrically related to their associated enlarged portions.

4. A thermally operated valve for closed circuit systems comprising, in combination, a hollow metal body forming a chamber having inlet and outlet ports defined therein, a non-fusible plug within said chamber extending across said inlet port sealing said inlet port, said outlet port including a tubular sleeve in surrounding relation having an arcuate surfaced free end extending therefrom into said chamber preventing said plug from accidentally restricting said outlet port upon release from said inlet port, and a fusible bonding material affixing said plug to said body across said inlet port whereby heat externally applied to said body melts said bonding material permitting said plug to be released from said inlet port and be freely confined within said chamber.

* * * * *